United States Patent [19]
Marando et al.

[11] Patent Number: 6,016,603
[45] Date of Patent: Jan. 25, 2000

[54] METHOD OF HYDROFORMING A VEHICLE FRAME COMPONENT

[75] Inventors: Richard A. Marando, Mohrsville; Thomas R. Sanko, Hazleton; Eric M. Schrack, Mohrsville, all of Pa.

[73] Assignee: Dana Corporation, Toledo, Ohio

[21] Appl. No.: 09/076,683

[22] Filed: May 12, 1998

Related U.S. Application Data

[60] Provisional application No. 60/046,221, May 12, 1997.

[51] Int. Cl.$^7$ ...................................................... B23P 11/02
[52] U.S. Cl. ......................... 29/897.2; 29/421.1; 29/523; 72/61
[58] Field of Search .................................. 29/897.2, 897, 29/897.3, 421.1, 523; 72/58, 61, 62, 370.22

[56] References Cited

U.S. PATENT DOCUMENTS

| | | |
|---|---|---|
| Re. 33,990 | 7/1992 | Cudini . |
| 4,567,743 | 2/1986 | Cudini . |
| 4,744,237 | 5/1988 | Cudini . |
| 4,829,803 | 5/1989 | Cudini .......................................... 72/61 |
| 5,097,689 | 3/1992 | Pietrobon . |
| 5,339,667 | 8/1994 | Shah et al. . |
| 5,353,618 | 10/1994 | Roper et al. ................................. 72/58 |
| 5,363,544 | 11/1994 | Wells et al. ................................ 29/523 |
| 5,499,520 | 3/1996 | Roper . |
| 5,582,052 | 12/1996 | Rigsby ......................................... 72/62 |
| 5,673,470 | 10/1997 | Dehlinger et al. ...................... 29/421.1 |
| 5,673,929 | 10/1997 | Alatalo .................................... 29/897.2 |

*Primary Examiner*—Irene Cuda
*Assistant Examiner*—Trinh T. Nguyen
*Attorney, Agent, or Firm*—MacMillan, Sobanski & Todd, LLC

[57] ABSTRACT

A method for hydroforming a closed channel structural member that allows the perimeter to be increased, but which maintains a relatively uniform wall thickness throughout, includes the initial step of disposing a closed channel structural member, such as a tube, within a first hydroforming die defining a first die cavity. The inner surface of the first die cavity corresponds in cross sectional shape to the outer surface of the tube, but the perimeter of the first die cavity is somewhat larger than the perimeter of the tube enclosed therein. A preliminary hydroforming operation is then performed at a relatively high pressure to expand the tube into conformance with the first die cavity. Throughout most of this expansion, the outer surface of the tube does not engage the inner surface of the die cavity. As a result, as the perimeter of the tube is increase, the wall thickness thereof is decreased uniformly. The preliminarily expanded tube is then disposed within a second hydroforming die defining a second die cavity. The inner surface of the second die cavity corresponds in cross sectional shape to the desired final shape for the tube. When the second hydroforming die is closed, a final hydroforming operation is performed at a relatively low pressure to deform the tube into conformance with the second die cavity. Because the perimeter of the tube is approximately equal to the perimeter of the second die cavity, the wall thickness of the tube is unchanged by the final hydroforming operation.

15 Claims, 3 Drawing Sheets

METHOD OF HYDROFORMING A VEHICLE FRAME COMPONENT

CROSS REFERENCE TO RELATED APPLICATION

This application claims the benefit of U.S. Provisional Application Ser. No. 60/046,221, filed May 12, 1997.

BACKGROUND OF THE INVENTION

This invention relates in general to methods for hydroforming closed channel structural members to desired shapes, such as components for vehicle frame assemblies. More specifically, this invention relates to an improved method for hydroforming a closed channel structural member by means of a two-stage process including (1) an initial relatively high pressure hydroforming operation, wherein a portion of the member is expanded to achieve a relatively small but essentially uniform wall thickness, and (2) a subsequent low pressure hydroforming operation, wherein a portion of the member is deformed into a desired shape while maintaining the relatively small but essentially uniform wall thickness.

Many land vehicles in common use, such as automobiles, vans, and trucks, include a body and frame assembly that is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

One well known example of a separate type of vehicular body and frame assembly is commonly referred to as a ladder frame assembly. A ladder frame assembly includes a pair of longitudinally extending side rails that are joined together by a plurality of transversely extending cross members. The cross members connect the two side rails together and provide desirable lateral, vertical, and torsional stiffness to the ladder frame assembly. The cross members can also be used to provide support for various components of the vehicle. Depending upon the overall length of the vehicle and other factors, the side rails of a conventional ladder frame assembly may be formed either from a single, relatively long structural member or from a plurality of individual, relatively short structural members that are secured together. For example, in vehicles having a relatively short overall length, it is known to form each of the side rails from a single integral structural member that extends the entire length of the vehicle body and frame assembly. In vehicles having a relatively long overall length, it is known to form each of the side rails from two or more individual structural members that are secured together, such as by welding, to provide a unitary structural member that extends the entire length of the vehicle body and frame assembly.

Traditionally, the various components of known vehicle body and frame assemblies have been formed from open channel structural members, i.e., structural members that have a non-continuous cross sectional shape (U-shaped or C-shaped channel members, for example). Thus, it is known to use one or more open channel structural members to form the side rails, the cross members, and other components of a vehicle body and frame assembly. However, the use of open channel structural members to form the various components of a vehicle body and frame assemblies has been found to be undesirable for several reasons. First, it is relatively time consuming and expensive to bend portions of such components to conform to a desired final shape, as is commonly necessary. Second, after such bending has been performed, a relatively large number of brackets or other mounting devices must usually be secured to some or all of such components to facilitate the attachment of the various parts of the vehicle to the body and frame assembly. Third, in some instances, it has been found difficult to maintain dimensional stability throughout the length of such components, particularly when two or more components are welded or otherwise secured together.

To address this, it has been proposed to form one or more of the various vehicle body and frame components from closed channel structural members, i.e., structural members that have a continuous cross sectional shape (tubular or box-shaped channel members, for example). This cross sectional shape is advantageous because it provides strength and rigidity to the vehicle body and frame component. Also, this cross sectional shape is desirable because it provides vertically and horizontally oriented side surfaces that facilitate the attachment of brackets and mounts used to support the various parts of the vehicle to the body and frame assembly. In some instances, the various parts of the vehicle may be directly attached to the vertically and horizontally oriented side surfaces of the vehicle body and frame assembly.

In vehicle body and frame assemblies of this type, it is known that the closed channel structural member may be deformed to a desired shape by hydroforming. Hydroforming is a well known process that uses pressurized fluid to deform a closed channel structural member into a desired shape. To accomplish this, the closed channel structural member is initially disposed between two die sections of a hydroforming apparatus that, when closed together, define a die cavity having a desired final shape. Thereafter, the closed channel structural member is filled with a pressurized fluid, typically a relatively incompressible liquid such as water. The pressure of the fluid is increased to a magnitude where the closed channel structural member is expanded or otherwise deformed outwardly into conformance with the die cavity. As a result, the closed channel structural member is deformed into the desired final shape.

Hydroforming has been found to be a desirable forming process because portions of a closed channel structural member can be quickly and easily deformed to have a complex cross sectional shape. In those instances where the perimeter of the closed channel structural member is essentially the same as the perimeter of the die cavity, the cross sectional shape of the closed channel structural member is changed during the hydroforming process. However, at least ideally, the wall thickness of the closed channel structural member should remain relatively constant throughout the deformed region. Hydroforming has also been found to be a desirable forming process because portions of a closed channel structural member can be quickly and easily expanded from a relatively small perimeter to a relatively large perimeter. In those instances where the perimeter of the closed channel structural member is somewhat smaller than the perimeter of the die cavity, not only is the cross sectional shape of the closed channel structural member changed during the hydroforming process, but the wall thickness thereof is decreased. However, at least ideally, the wall thickness of the closed channel structural member should decrease uniformly through the expanded region.

In practice, however, it has been found that hydroforming can introduce undesirable variations in the wall thickness of the closed channel structural member. As mentioned above, the outer surface of the closed channel structural member is deformed outwardly into engagement with the inner surface of the hydroforming die during the hydroforming operation. Because the inner surface of the hydroforming die is typically shaped differently from the outer surface of the closed channel structural member, one or more discrete portions of the outer surface of the closed channel structural member will initially engage the inner surface of the hydroforming die prior to engagement by the remaining portions thereof. These initially engaging portions of the outer surface of the closed channel structural member are frictionally locked in position at the points of engagement because of the outwardly directed forces generated by the high pressure hydroforming fluid. As a result, the remaining portions of the closed channel structural member are stretched from the initially engaging portions as the deformation of the closed channel structural member is completed.

Such stretching results in undesirable variations of the wall thickness variations throughout the perimeter of the closed channel structural member. These wall thickness variations can be particularly acute when the hydroforming operation not only deforms the perimeter of the closed channel structural member, but also expands the magnitude of the perimeter thereof. These wall thickness variations can result in undesirable weaknesses in the formed closed channel structural member. One solution would be to increase the wall thickness of the entire closed channel structural member such that the most extreme reductions in the wall thickness thereof would not adversely affect the overall strength of the member for its intended use. However, such over-designing undesirably increases the overall weight and cost of the closed channel structural member and the resultant vehicle frame component. Thus, it would be desirable to provide an improved method for hydroforming a closed channel structural member that allows the perimeter thereto to be increased, but which maintains a relatively uniform wall thickness throughout.

SUMMARY OF THE INVENTION

This invention relates to an improved method for hydroforming a closed channel structural member that allows the perimeter thereto to be increased, but which maintains a relatively uniform wall thickness throughout. Initially, a closed channel structural member, such as a tube, is pre-bent and disposed within a first hydroforming die defining a first die cavity. The inner surface of the first die cavity preferably corresponds in cross sectional shape to the outer surface of the tube throughout some or all of the length thereof, but the perimeter of the first die cavity is somewhat larger than the perimeter of the tube enclosed therein. The tube is preferably supported concentrically within the die cavity. Then, a preliminary hydroforming operation is then performed at a relatively high pressure to expand the tube into conformance with the first die cavity. Throughout most of this expansion, the outer surface of the tube does not engage the inner surface of the die cavity. As a result, as the perimeter of the tube is increase, the wall thickness thereof is decreased uniformly. The preliminarily expanded tube is then disposed within a second hydroforming die defining a second die cavity. The inner surface of the second die cavity corresponds in cross sectional shape to the desired final shape for the tube. When the second hydroforming die is closed, a final hydroforming operation is performed at a relatively low pressure to deform the tube into conformance with the second die cavity. Because the perimeter of the tube is approximately equal to the perimeter of the second die cavity, the wall thickness of the tube is essentially unchanged by the final hydroforming operation. Consequently, a relatively larger amount of such expansion can occur than would normally be available if it was necessary to account for variations in the wall thickness of the tube resulting from frictional engagement of the tube with the first hydroforming die.

DETAILED DESCRIPTION OF THE PREFERRED EMBODIMENT

Figure 1:
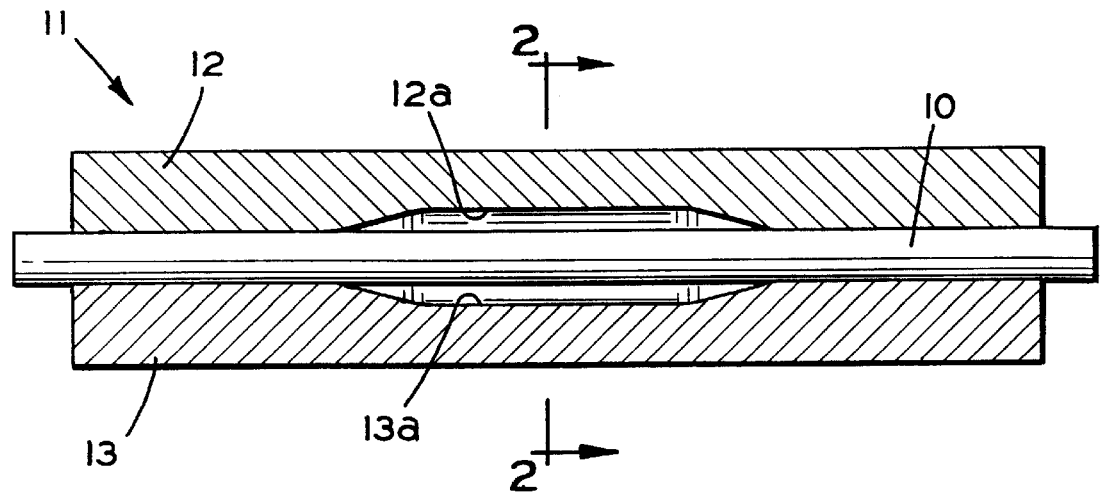
FIG. 1 is a sectional elevational view of a closed channel structural member disposed within a first hydroforming die prior to the commencement of a preliminary hydroforming operation in accordance with the method of this invention.
Figure 2:
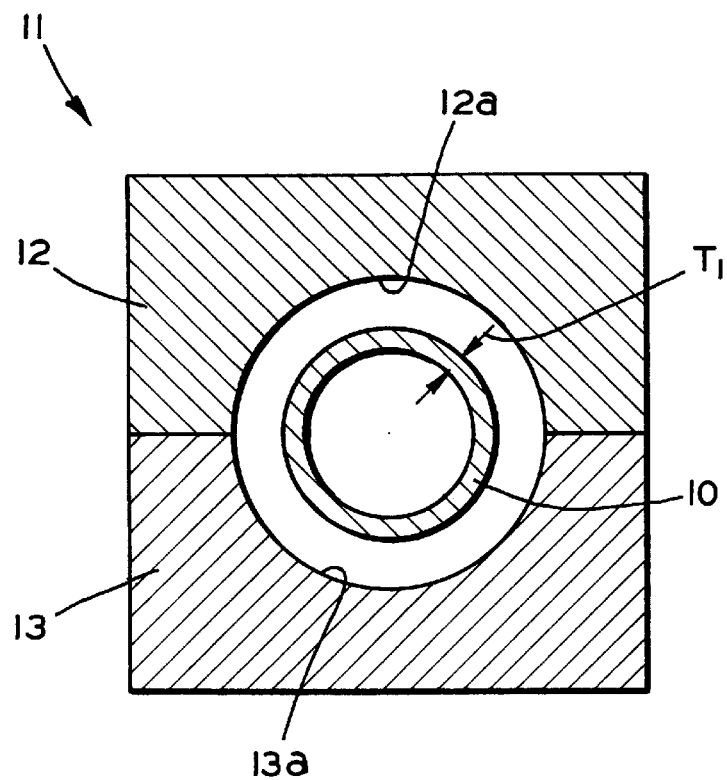
FIG. 2 is an enlarged sectional elevational view taken along line 2—2 of FIG. 1.

Referring now to the drawings, there is illustrated in FIGS. 1 and 2 a closed channel structural member, such as a tube 10, that can be used in conjunction with the method of this invention to form a vehicle frame component or other desired article. The tube 10 is conventional in the art and is preferably formed having a uniform wall thickness $T_1$ through the length thereof The tube 10 is disposed within a first hydroforming die, indicated generally at 11, that is composed of a first die section 12 and a second die section 13. As is well known, the die sections 12 and 13 have respective cavity portions 12a and 13a formed therein that cooperate to form a hydroforming die cavity when the die sections 12 and 13 are moved into engagement with one another as shown. Although the method of this invention will be explained and illustrated in conjunction with the illustrated linearly extending tube 10, it will be appreciated that this invention may be practiced with a tube that has been pre-bent, such as in a conventional tube bending apparatus, to have one or more bends therein.

The inner surface of the die cavity of the first hydroforming die 11 preferably corresponds in cross sectional shape to the outer surface of the tube 10 throughout some or all of the length thereof. Thus, in the illustrated embodiment, the cross sectional shape of the die cavity of the first hydroforming die 11 is circular throughout the length thereof, corresponding in shape to the circular outer surface of the tube 10. However, it is contemplated that the tube 10 and the first hydroforming die 11 may have other cross sectional shapes as desired. As best shown in FIG. 1, the perimeter of the central portion of the die cavity of the first hydroforming die 11 is somewhat larger than the perimeter of the tube 10. As will be explained in detail below, the perimeter of the tube 10 will be increased within this enlarged central portion of the die cavity of the first hydroforming die 11. For reasons that will become apparent below, the tube 10 is preferably supported concentrically within the enlarged central portion of the die cavity of the first hydroforming die 11.

Figure 3:
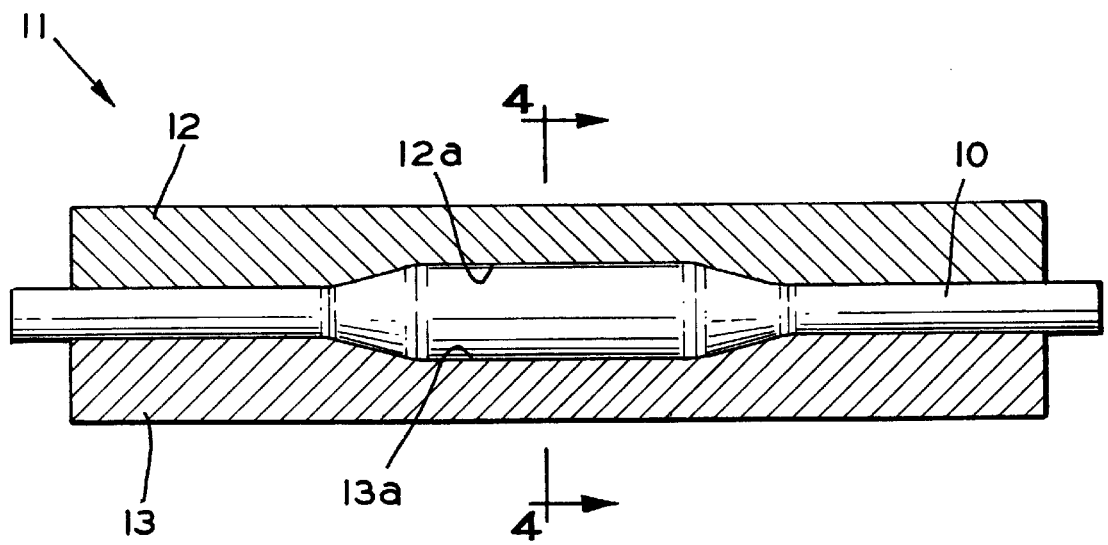
FIG. 3 is a sectional elevational view of the closed channel structural member and the first hydroforming die illustrated in FIGS. 1 and 2 after the completion of the preliminary hydroforming operation.
Figure 4:
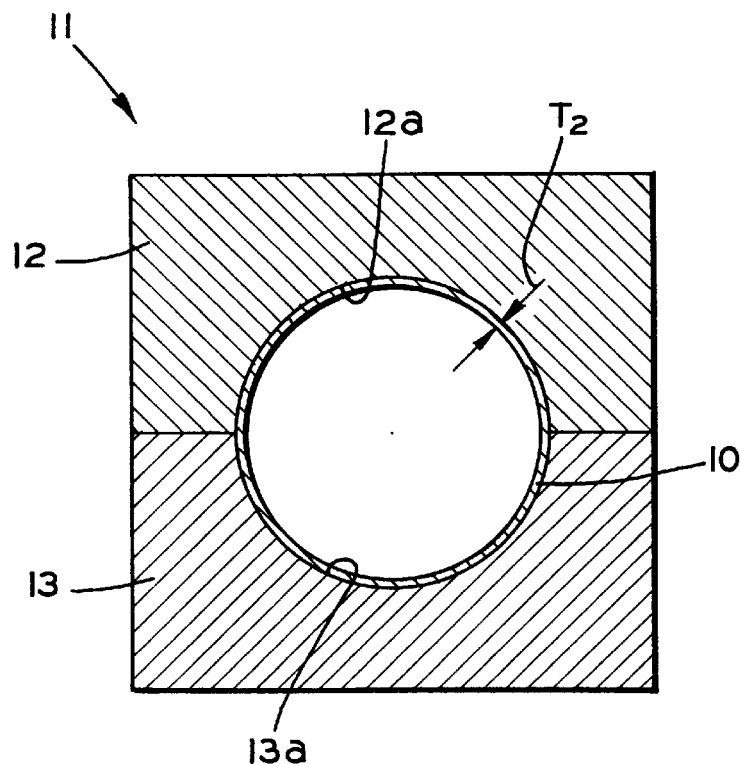
FIG. 4 is an enlarged sectional elevational view taken along line 4—4 of FIG. 3.

FIGS. 3 and 4 show the tube 10 after the completion of a preliminary hydroforming operation. The hydroforming operation is, of itself, conventional in the art and uses pressurized fluid to deform and expand the tube 10 into conformance with the die cavity of the first hydroforming die 11. To accomplish this, the tube 10 is filled with a pressurized fluid, typically a relatively incompressible liquid such as water. The pressure of the fluid is increased to a magnitude where the tube 10 is deformed outwardly into conformance with the die cavity. As a result, the tube 10 is deformed into the shape illustrated in FIGS. 3 and 4. Any conventional apparatus may be used to perform the preliminary hydroforming operation.

As shown in FIGS. 3 and 4, the preliminary hydroforming operation is effective to increase the perimeter of the central portion of the tube 10 to correspond with the perimeter of the central portion of the die cavity of the first hydroforming die 11. Because of this, the wall thickness of the central portion of the tube 10 is decreased to a wall thickness $T_2$ that is somewhat less than the original wall thickness $T_1$. Notwithstanding this reduction, the wall thickness of the central portion of the tube 10 is essentially uniform not only circumferentially as shown in FIG. 4, but also axially throughout most of the entire central portion of the tube 10. This is because the tube 10 is expanded in substantially the same cross sectional shape (circular in the illustrated embodiment) as the cross sectional shape of the enlarged central portion of the die cavity of the first hydroforming die 11. The wall thickness of the tube 10 will gradually increase at the junction between the central portion of the tube 10 and the two ends thereof. In the illustrated embodiment, the ends of the tube 10 remain in essentially their original condition and wall thickness. However, it will be appreciated that such ends (or other portions of the tube 10) may be deformed during this preliminary hydroforming operation.

Figure 5:
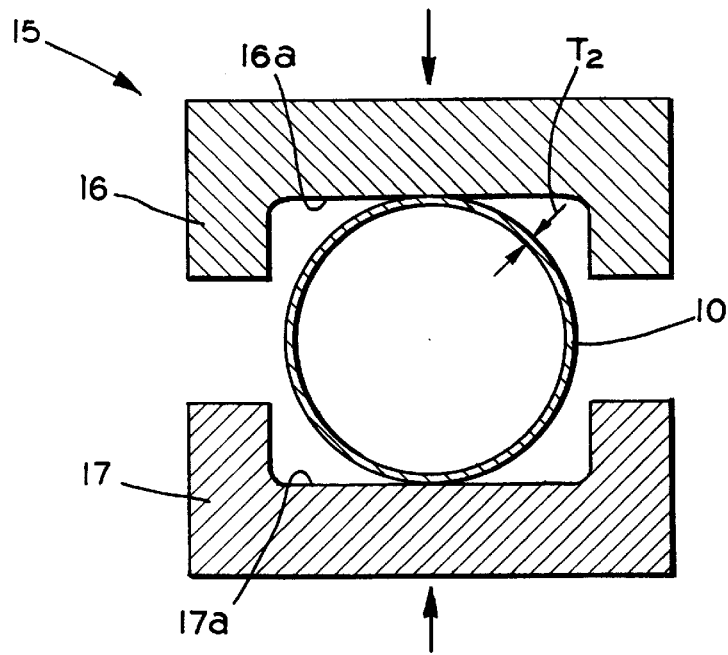
FIG. 5 is a sectional elevational view of the preliminarily deformed closed channel structural member illustrated in FIGS. 3 and 4 disposed within a second hydroforming die prior to the closing of the die sections and commencement of a final hydroforming operation.

FIG. 5 illustrates the preliminarily expanded tube 10 disposed within a second hydroforming die, indicated generally at 15, that is composed of a first die section 16 and a second die section 17. As with the first hydroforming die 11, the die sections 16 and 17 have respective cavity portions 16a and 17a formed therein that cooperate to form a hydroforming die cavity when the die sections 16 and 17 are moved into engagement with one another. In FIG. 5, the die sections 16 and 17 are shown in the process of being moved toward one another, as shown by the respective arrows. Thus, only the opposed upper and lower portions of the expanded tube 10 are shown as being engaged by the die sections 16 and 17. The inner surface of the die cavity of the second hydroforming die 15 preferably corresponds in cross sectional shape to the desired final shape for the tube 10. The cross sectional shape of the die cavity of the second hydroforming die 15 can vary as desired throughout the axial length thereof.

Figure 6:
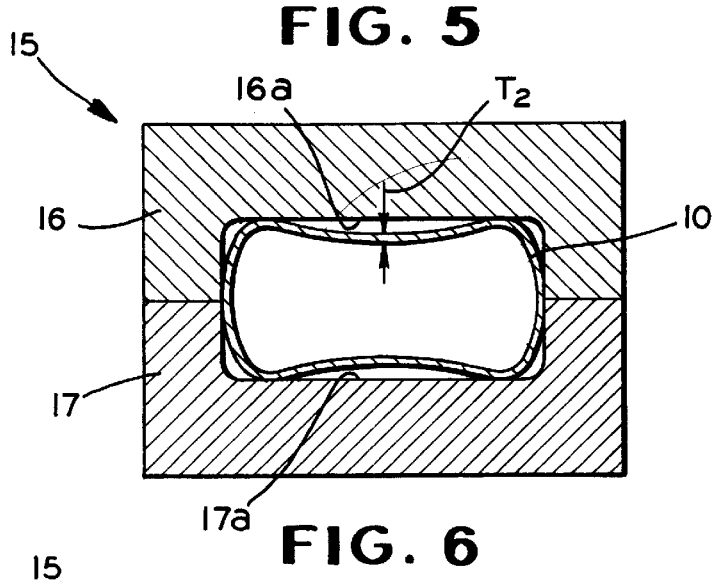
FIG. 6 is a sectional elevational view similar to FIG. 5 after the closing of the die sections, but prior to the commencement of the final hydroforming operation.
Figure 7:
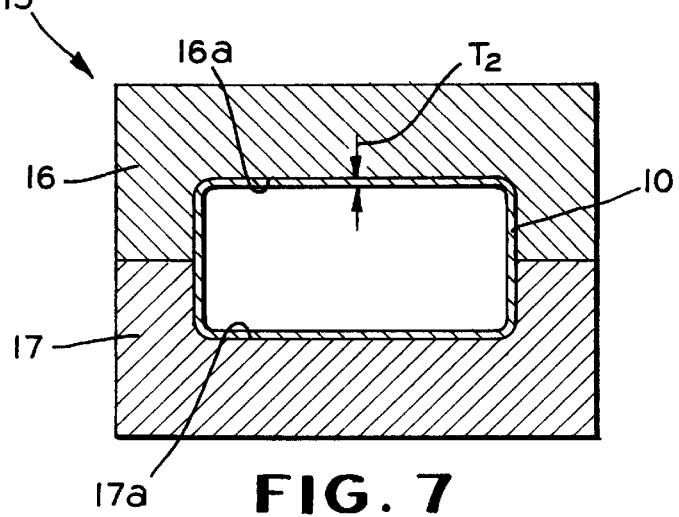
FIG. 7 is a sectional elevational view similar to FIG. 6 after commencement of the final hydroforming operation.

FIG. 6 illustrates the die sections 16 and 17 after being moved into engagement with one another, but prior to the commencement of the final hydroforming operation. As shown therein, the perimeter of the illustrated portion of the die cavity of the second hydroforming die 15 is approximately equal to the perimeter of the expanded tube 10. Thus, when the two die sections 16 and 17 are moved into engagement with one another, portions of the tube 10 may be deformed inwardly so as to fit completely within the die cavity of the second hydroforming die 15 without being pinched therebetween. Thereafter, a final hydroforming operation is performed to complete the formation of the tube 10 into the finished article. FIG. 7 shows the tube 10 after the completion of this final hydroforming operation. As with the preliminary hydroforming operation described above, the final hydroforming operation uses pressurized fluid to deform and expand the tube 10 into conformance with the die cavity of the second hydroforming die 15. The final hydroforming operation is effective to deform the tube 10 to correspond in shape with the shape of the die cavity of the second hydroforming die 15. However, because the perimeter of the tube 10 is approximately equal to the perimeter of the die cavity of the second hydroforming die 15, the wall thickness of the tube 10 after the second hydroforming operation is completed is essentially maintained at the wall thickness $T_2$. If desired, the interior of the expanded tube 10 may be lightly pressurized as the die sections 16 and 17 are moved toward one another to resist collapsing and cause the expanded tube 10 to conform to the shape of the die cavity.

Thus, it will be appreciated that the preliminary hydroforming operation is effective to expand the tube 10 within the first hydroforming die, thereby increasing the perimeter of the tube 10 while decreasing the wall thickness thereof. Thus, the preliminary hydroforming operation is preferably performed by supplying fluid at a relatively high pressure within the tube 10. For the reasons set forth above, the initial expansion of the circular cross section tube 10 within the circular die cavity of the first hydroforming die 11 causes the reduction in the wall thickness of the tube 10 to be substantially uniform. Consequently, a relatively larger amount of such expansion can occur than would normally be available if it was necessary to account for variations in the wall thickness of the tube 10 resulting from frictional engagement of the tube 10 with the first hydroforming die 11. This pre-expansion of the tube 10 further allows the final hydroforming operation to be substantially limited to deformation of the enlarged tube 10, wherein the perimeter and wall thickness of the tube are substantially unchanged. During this final hydroforming operation, the material forming the tube 10 merely slides into conformance with the die cavity. Thus, the final hydroforming operation can be performed by supplying fluid at a relatively low pressure within the tube 10. Thus, the method of this invention permits greater expansion of the tube 10 and the use of thinner wall thicknesses than has been previously attainable.

As mentioned above, the preliminary hydroforming operation is preferably performed by supplying fluid at a relatively high pressure within the tube 10, expanding the material of the tube 10 to correspond with the shape of the die cavity of the first hydroforming die 11. This relatively high pressure expansion tends to eliminate springback in the formed tube 10. The amount of pressure required to effect the initial hydroforming operation is a function of several factors, including wall thickness, yield strength, and minimum inside radius of the tube 10. The final hydroforming operation is preferably performed by supplying fluid at a relatively low pressure within the tube 10, deforming the material of the tube 10 to correspond with the shape of the die cavity of the second hydroforming die 15. This relatively low pressure expansion does not tend to eliminate springback in the formed tube 10. However, because the final hydroforming operation merely moves the material of the tube 10 to desired locations, as opposed to expanding it, acceptable tolerances can be maintained for the finished article.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of hydroforming a closed channel structural member comprising the steps of:

(a) disposing the closed channel structural member within a die cavity of a first hydroforming die defining a perimeter that is larger than the perimeter of the closed channel structural member;

(b) performing a preliminary hydroforming operation to expand the closed channel structural member into conformance with the die cavity of the first hydroforming die such that the perimeter of the closed channel structural member is increased;

(c) disposing the closed channel structural member within a die cavity of a second hydroforming die defining a perimeter that is approximately the same as the perimeter of the closed channel structural member; and (d) performing a final hydroforming operation to deform the closed channel structural member into conformance with the die cavity of the second hydroforming die such that the perimeter of the closed channel structural member remains approximately the same.

2. The method defined in claim 1 wherein said step (a) is performed by providing the closed channel structural member with a shape that corresponds with the shape of the die cavity of the first hydroforming die.

3. The method defined in claim 2 wherein the closed channel structural member has an outer surface defining a circular cross sectional shape, and wherein the die cavity of the first hydroforming die has an inner surface defining a circular cross sectional shape.

4. The method defined in claim 1 wherein said step (a) is performed by supporting the closed channel structural member concentrically within the die cavity of the first hydroforming die.

5. The method defined in claim 1 wherein the wall thickness of said closed channel structural member is reduced during said step (b).

6. The method defined in claim 5 wherein the wall thickness of said closed channel structural member is reduced substantially uniformly during said step (b).

7. The method defined in claim 1 including the preliminary step of pre-bending the closed channel structural member prior to disposing it within a die cavity of a first hydroforming die.

8. The method defined in claim 1 wherein said step (b) is performed at a relatively high pressure, and said step (d) is performed at a relatively low pressure.

9. The method defined in claim 1 wherein step (d) is performed by providing the closed channel structural member with a shape that corresponds with the shape of the die cavity of the second hydroforming die.

10. The met hod defined in claim 9 wherein the closed channel structural member has an outer surface defining a non-circular cross sectional shape, and wherein the die cavity of the second hydroforming die has an inner surface defining a non-circular cross sectional shape.

11. The method defined in claim 1 wherein the wall thickness of the closed channel structural member is essentially unchanged during said step (d).

12. The method defined in claim 1 wherein at least a portion of the closed channel structural member is deformed during said step (c).

13. A method of hydroforming a closed channel structural member comprising the steps of:

(a) disposing the closed channel structural member within a die cavity of a first hydroforming die defining a perimeter that is larger than the perimeter of the closed channel structural member;

(b) performing a preliminary hydroforming operation to expand the perimeter of the closed channel structural member into conformance with the die cavity of the first hydroforming die;

(c) disposing the closed channel structural member within a die cavity of a second hydroforming die defining a perimeter that is approximately the same as the perimeter of the closed channel structural member; and (d) performing a final hydroforming operation to deform the closed channel structural member into conformance with the die cavity of the second hydroforming die, whereby a wall thickness of the closed channel structural member decreases during the preliminary hydroforming operation, and whereby the wall thickness of the closed channel structural member remains essentially constant during the final hydroforming operation.

14. The method defined in claim 13 wherein the die cavity of the first hydroforming die has an inner surface defining a circular cross sectional shape, and wherein the die cavity of the second hydroforming die has an inner surface defining a non-circular cross sectional shape.

15. The method defined in claim 13 wherein at least a portion of the closed channel structural member is deformed during said step (c).

* * * * *